US010588311B1

(12) United States Patent
Raynal (10) Patent No.: US 10,588,311 B1
(45) Date of Patent: Mar. 17, 2020

(54) SEALABLE ANIMAL CARCASS ENCLOSEMENT SYSTEMS AND METHODS (71) Applicant: Philip Raynal, Roseville, CA (US)

(72) Inventor: Philip Raynal, Roseville, CA (US)

(*) Notice: Subject to any disclaimer, the term of this patent is extended or adjusted under 35 U.S.C. 154(b) by 0 days.

(21) Appl. No.: 15/681,172

(22) Filed: Aug. 18, 2017

Related U.S. Application Data (60) Provisional application No. 62/376,663, filed on Aug. 18, 2016.

(51) Int. Cl.
| | | |
|---|---|---|
| *A61M 31/00* | (2006.01) |
| *A01M 31/00* | (2006.01) |
| *A22B 5/00* | (2006.01) |
| *B65B 67/08* | (2006.01) |
| *B65D 51/00* | (2006.01) |
| *A22C 17/00* | (2006.01) |
| *A01K 97/00* | (2006.01) |

(52) U.S. Cl.
CPC .............. *A01M 31/006* (2013.01); *A22B 5/00* (2013.01); *A22C 17/0093* (2013.01); *B65B 67/08* (2013.01); *B65D 51/00* (2013.01); *A01K 97/00* (2013.01)

(58) Field of Classification Search
CPC .............................. A22B 7/008; A01M 31/006
USPC .......... 383/4, 26, 27; 27/28; 206/284–287.1, 206/289–291; 224/103, 921; 280/18–20; 47/24.1, 29.7
See application file for complete search history.

(56) References Cited

U.S. PATENT DOCUMENTS

| | | | |
|---|---|---|---|
| 383,327 A | * | 5/1888 | Starr .................. A01G 13/0237 47/24.1 |
| 1,725,864 A | | 8/1929 | James |
| 1,920,824 A | | 8/1933 | West |
| 2,186,384 A | | 1/1940 | Lester |
| 2,208,861 A | | 7/1940 | Smith |
| 2,323,318 A | | 7/1943 | Farkas |
| 2,518,651 A | | 8/1950 | Weiss et al. |
| 2,679,960 A | | 6/1954 | Lowe |
| 2,682,290 A | | 6/1954 | Ditlea |
| 2,756,912 A | | 7/1956 | Armstrong |
| 2,788,822 A | | 4/1957 | Parker |
| 2,795,889 A | | 6/1957 | Garland |
| 3,025,629 A | | 3/1962 | Sears |

(Continued)

OTHER PUBLICATIONS

Amazon.com : Alaska Game Deer, Antelope and Sheep Bags, 48-Inch (Pack of Four) : Hunting Game Belts and Bags : Sports & Outdoors, Jul. 31, 2017, 6 pages.

(Continued)

*Primary Examiner* — Jes F Pascua
*Assistant Examiner* — Nina K Attel
(74) *Attorney, Agent, or Firm* — Santangelo Law Offices, P.C.

(57) ABSTRACT

Embodiments of the present invention may provide a sealable animal carcass enclosement system perhaps including a substantially planar foldable envelope perhaps made of a vinyl coated mesh material, sealing securements along an edge of some of the sides of the substantially planar foldable envelope when in said open state; and perhaps even a plication component configured to guide overlapping closure of said substantially planar foldable envelope and matching of counterparts of said sealing securements so as to provide an enclosed packet for animal carcasses.

17 Claims, 11 Drawing Sheets

(56) References Cited

U.S. PATENT DOCUMENTS

| | | | |
|---|---|---|---|
| 3,074,074 A | 1/1963 | Lovering | |
| 3,150,640 A | 9/1964 | Nevitt | |
| 3,674,188 A | 7/1972 | Anderson | |
| 3,777,498 A | 12/1973 | Andrews et al. | |
| 3,988,853 A | 11/1976 | Hudkins | |
| 4,137,870 A | 2/1979 | Cano | |
| 4,197,890 A | 4/1980 | Simko | |
| 4,301,920 A | 11/1981 | Boggs | |
| D269,224 S | 6/1983 | Church | |
| 4,498,190 A | 2/1985 | Garlick, III | |
| D278,389 S | 4/1985 | Kircher et al. | |
| 4,713,033 A | 12/1987 | Cameron | |
| 4,775,082 A | 10/1988 | Krache | |
| 4,785,766 A | 11/1988 | Blalock, Jr. | |
| 4,796,567 A | 1/1989 | Allan et al. | |
| 4,884,732 A | 12/1989 | Sunderland | |
| 4,887,823 A | 12/1989 | Hallett et al. | |
| 4,949,842 A | 8/1990 | Mokiao, II | |
| 4,980,988 A | 1/1991 | Whitman | |
| 4,989,995 A | 2/1991 | Rubenstein et al. | |
| 5,230,304 A | 7/1993 | Santoro | |
| 5,238,305 A | 8/1993 | Feller | |
| 5,238,307 A | 8/1993 | Mooney et al. | |
| 5,336,124 A | 8/1994 | Garside | |
| 5,349,966 A | 9/1994 | Garcia | |
| D356,948 S | 4/1995 | Nahatchewitz | |
| 5,467,734 A | 11/1995 | Ho | |
| 5,467,907 A | 11/1995 | Celik | |
| 5,761,992 A | 6/1998 | Gallo | |
| D424,254 S | 5/2000 | Rooney | |
| 6,253,569 B1 | 7/2001 | Hall | |
| 6,276,698 B1 | 8/2001 | Calandra | |
| 6,394,039 B1 | 5/2002 | Grauer | |
| 6,508,077 B1 | 1/2003 | Vander Boegh et al. | |
| 6,520,120 B1 | 2/2003 | Arnold et al. | |
| 6,575,626 B1 | 6/2003 | Gillespie, Jr. et al. | |
| 6,889,882 B1 | 5/2005 | Leep | |
| 7,160,028 B1 | 1/2007 | Linday | |
| 7,338,210 B1 | 3/2008 | Fultz et al. | |
| 7,370,660 B2 | 5/2008 | Hamilton et al. | |
| 7,832,743 B2 | 11/2010 | Small | |
| 7,954,503 B2 | 6/2011 | Glass | |
| 8,066,163 B2 | 11/2011 | Newcomb | |
| 8,146,217 B2 * | 4/2012 | Jensen | A61G 17/06 27/28 |
| 8,454,236 B2 | 6/2013 | Ramirez | |
| 8,562,213 B1 | 10/2013 | McBee | |
| 8,757,638 B2 * | 6/2014 | Proch | B62B 15/007 224/921 |
| 9,610,204 B1 | 4/2017 | Steinbock et al. | |
| 2001/0019638 A1 | 9/2001 | Fox et al. | |
| 2003/0128897 A1 | 7/2003 | Lehrman | |
| 2004/0156564 A1 | 8/2004 | Glasser | |
| 2006/0153477 A1 | 7/2006 | Koguchi | |
| 2006/0171606 A1 | 8/2006 | Valentine | |
| 2006/0215940 A1 * | 9/2006 | May | A01G 20/43 383/4 |
| 2010/0284631 A1 | 11/2010 | Lee | |
| 2017/0013791 A1 * | 1/2017 | Jung | A01G 13/0237 |

OTHER PUBLICATIONS

Amazon.com : Alaska Game Alaska Moose/Elk/Bear Hide Transport Bag, 36X48-Inch : Hunting Game Belts and Bags : Sports & Outdoors, Jul. 31, 2017, 5 pages.

Amazon.com : Koola Buck Antimicrobial Deer Game Bags—4 Pack (Size Large) : Sports & Outdoors, Jul. 31, 2017, 6 pages.

Amazon.com : Allen Backcountry Meat Bags (Pack of 4) : Hunting Field Dressing Accessories : Sports & Outdoors, Jan. 31, 2017, 7 pages.

Amazon.com : Northern Game Deer, Antelope and Sheep Bags, 60-Inch (Pack of Four) : Hunting Game Belts and Bags : Sports & Outdoors, Jul. 31, 2017, 6 pages.

Amazon.com : Tourbon Hunting Game Quarter Bag Deer, Sheep, Anelope Carcass Transport Bags 72-inch : Sports & Outdoors, Jul. 31, 2017, 5 pages.

Amazon.com : TBK Industries Reusable Game Bag, Fluorescent Orange, Large : Hunting Game Belts and Bags : Sports & Outdoors, Jul. 31, 2017, 7 pages.

Cabela's Antimicrobial Game Bag : Cabela's, Jul. 31, 2017, 2 pages.

Great Outdoorsman Great Outdoorsman Big Game Bag (Whitetail Deer)—FishAndSave.com Discount Fishing Gear and Tackle, Jul. 31, 2017, 2 pages.

Kuiu Ultralight Hunting Supplies, Equipment & Apparel, Jul. 31, 2017, 1 page.

Sportsman's Warehouse, Lyle Re-Useable Deer Game Bag, Jul. 31, 2017, 1 page.

* cited by examiner

FIG. 11 ical Field

The invention relates generally to the field of flexible enclosement systems for harvested game. Specifically, the present inventive technology relates to storage and transportation systems for harvested game. In one embodiment, the inventive technology may encompass improved methods and apparatus for a portable game, fowl, fish, or domestic livestock storage system. In embodiments, the technology may include an encapsulated vinyl open mesh material with a hook-and-loop or Velcro closing system. The system may be useful for storing, transporting and preserving meat or parts of meat after harvesting, field dressing and/or butchering. The system may be sized to hold any size of animal or meat.

SEALABLE ANIMAL CARCASS ENCLOSEMENT SYSTEMS AND METHODS

This application is a US Non-Provisional application claiming the benefit of and priority to U.S. Provisional Application No. 62/376,663 filed Aug. 18, 2016, hereby incorporated by reference in its entirety herein.

TECHNICAL FIELD

The invention relates generally to the field of flexible enclosement systems for harvested game. Specifically, the present inventive technology relates to storage and transportation systems for harvested game. In one embodiment, the inventive technology may encompass improved methods and apparatus for a portable game, fowl, fish, or domestic livestock storage system. In embodiments, the technology may include an encapsulated vinyl open mesh material with a hook-and-loop or Velcro closing system. The system may be useful for storing, transporting and preserving meat or parts of meat after harvesting, field dressing and/or butchering. The system may be sized to hold any size of animal or meat.

BACKGROUND

Transport of slain game animals from the field has long been a challenge. Hunters and fishermen have previously protected their harvest in numerous ways to attempt to keep it safe and sanitary. Once an animal has been harvested, it may be important to properly cool the meat and allow airflow while restricting the access of insects or other undesirable materials. This has been done with game bags, which may be bags made of various materials, not including vinyl mesh, which may feature a top opening that can allow the meat or carcass to slide in. Such a top opening may be closed primarily with a drawstring.

Traditional game bags have presented problems in several areas that embodiments of this invention may address. Prior game bags have frequently used standard issue materials that degrade somewhat quickly and may have a relatively short life. Additionally, after each use, prior game bags have often required extensive cleaning prior to reuse, perhaps including soaking, machine washing, and/or the use of additional potentially caustic cleaning solutions to remove blood.

One past example is a fish preserving bag of U.S. Pat. No. 4,301,920. This is an ice bag to keep fish cold. It does not allow air flow nor any of the specific enveloping features of the present invention. Another example of past attempts is the game bag of U.S. Pat. No. 8,454,236. Like other game bags, this bag cinches to close resulting in a loss of precious storage space. In addition, this game bag, like many others, is a "bag" not an envelope like that discussed in the various embodiments of the present invention.

DETAILED DESCRIPTION OF INVENTION

Embodiments of the present invention provide improved storage systems that avoids many of the problems present in prior game bags. Embodiments of the present invention may include a vinyl coated material (1), which may be utilized for long-term outdoor use and can provide a reusable product. A vinyl coated material (1) may be such that a simple cold water rinse can perhaps adequately clean the product. In addition, the product may be fully openable to allow for full cleaning access.

Figure 6:
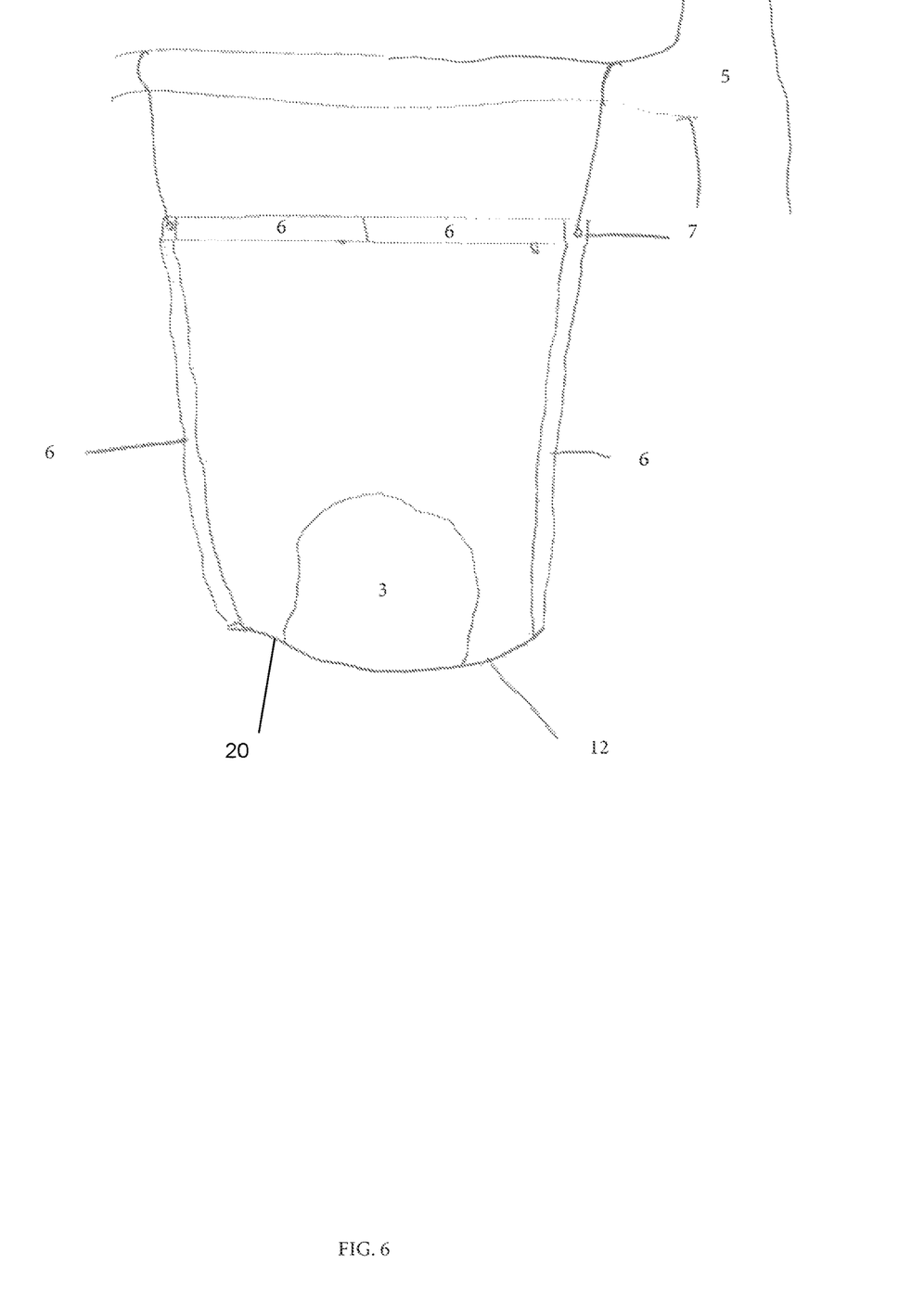
FIG. 6 is a view of an embodiment of the invention in use, shown hanging from a tree limb with a portion of meat inside a closed embodiment.
Figure 9:
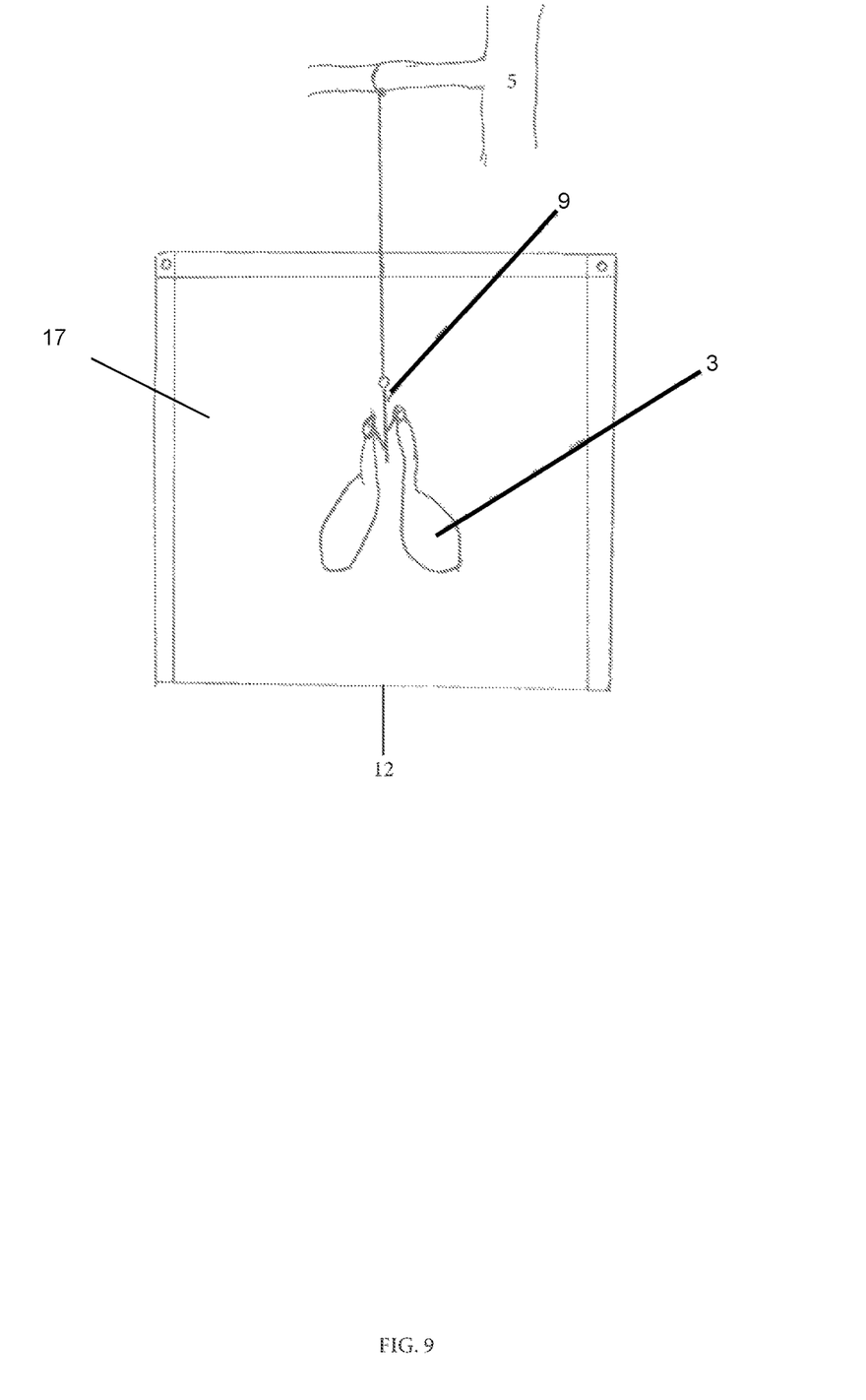
FIG. 9 is a view of an embodiment of the invention in use, showing an embodiment in the closed position hanging from a tree with portions of meat inside a bag attached to a rope or cable.

Embodiments of the present invention may allow for simpler insertion and even storage of a harvested animal (2), meat portion (3), or animal carcass (4). If a carcass (4) is perhaps hung from a tree (5), as shown in FIG. 6 and FIG. 9, it may be very simple to wrap embodiments of the invention around the carcass (4) and seal it in, perhaps with a sealing securement (6). A sealing securement may be any type of securement including but not limited to a hook-and-loop binding system, zipper, buttons, threading, and the like. If a carcass (4) is perhaps laying on the ground, as in FIG. 1, it may be much easier to utilize a substantially planar foldable envelope (13) by laying it on the ground, lay the carcass (4) on one side, and fold remaining portions of the envelope around the carcass (4) and perhaps seal it in. With a traditional game bag, sliding the bag over a large carcass (4) would perhaps be more difficult. Prior systems frequently require that a carcass (4) be placed on some sort of clean surface, perhaps a tarp, prior to pulling the bag on. Failure to do so often allows foreign material to contaminate the meat. In embodiments, a substantially planar foldable envelope (13) may be laid on the ground. The meat (3) may then be laid on top of the envelope, and the envelope may then be wrapped around the meat (3) and closed with a sealing securement (6). This may be accomplished without any attachment of foreign material, thus eliminating the need for a tarp or other clean surface.

In some embodiments, a substantially planar foldable envelope may be a flat sheet-like element, such as a tarp, blanket, or the like which may be pliable so that it can be folded. In other embodiments other envelopes may be utilized that are not substantially planar or the like.

Figure 2:
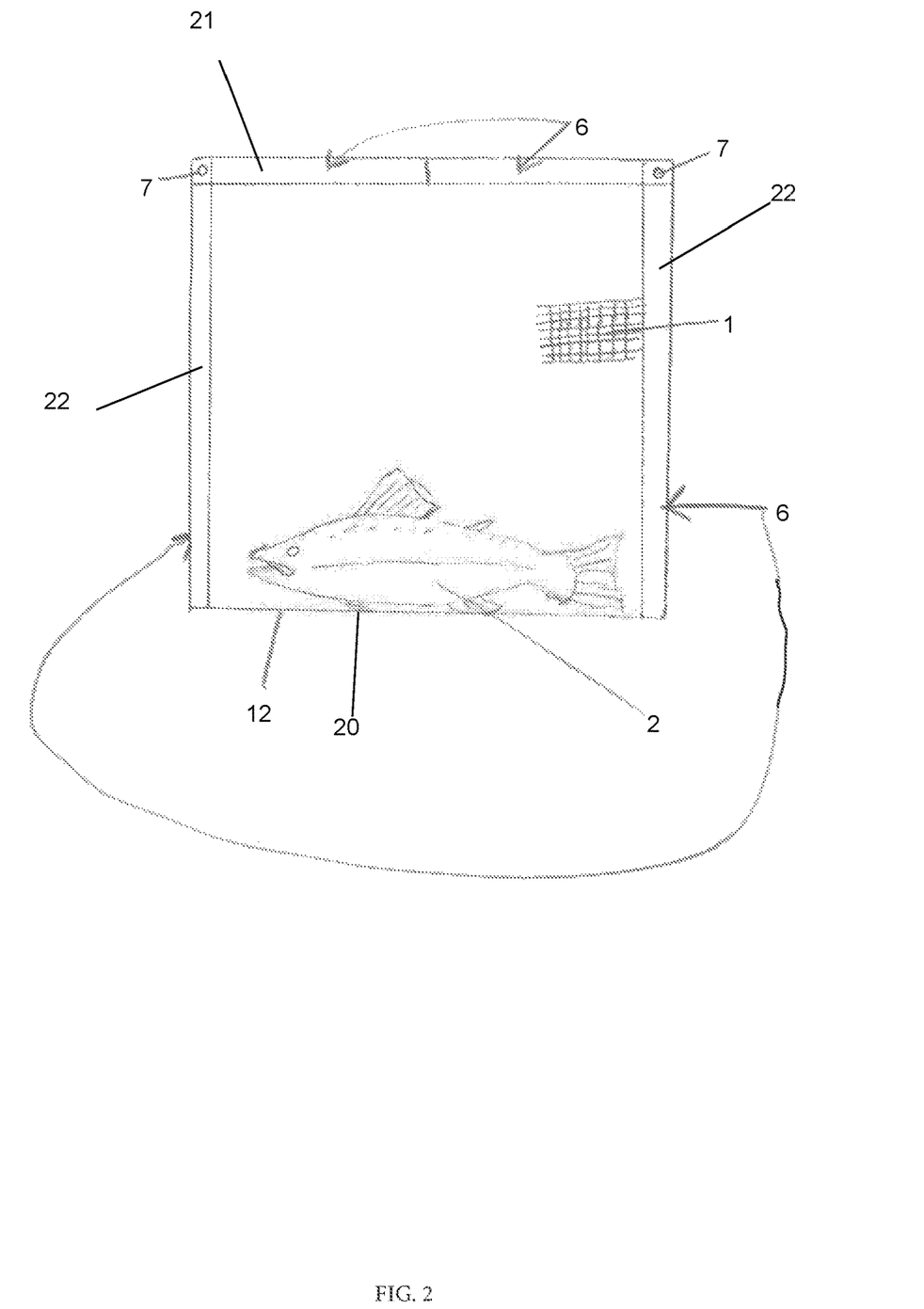
FIG. 2 is a view of an embodiment of the invention in use, with a fish placed inside a closed embodiment of the invention.
Figure 3:
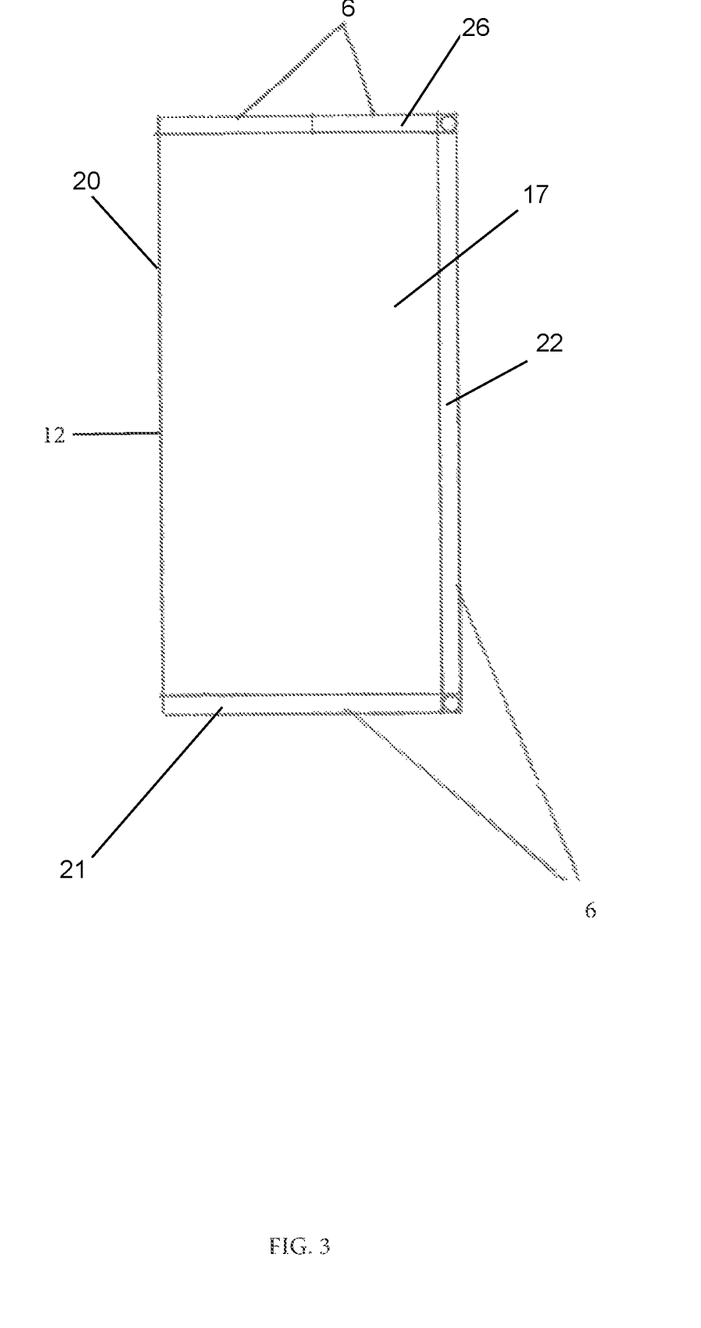
FIG. 3 is a view of an example template of multiple embodiments of the invention, wherein most of the variables discussed below can be manipulated.
Figure 4:
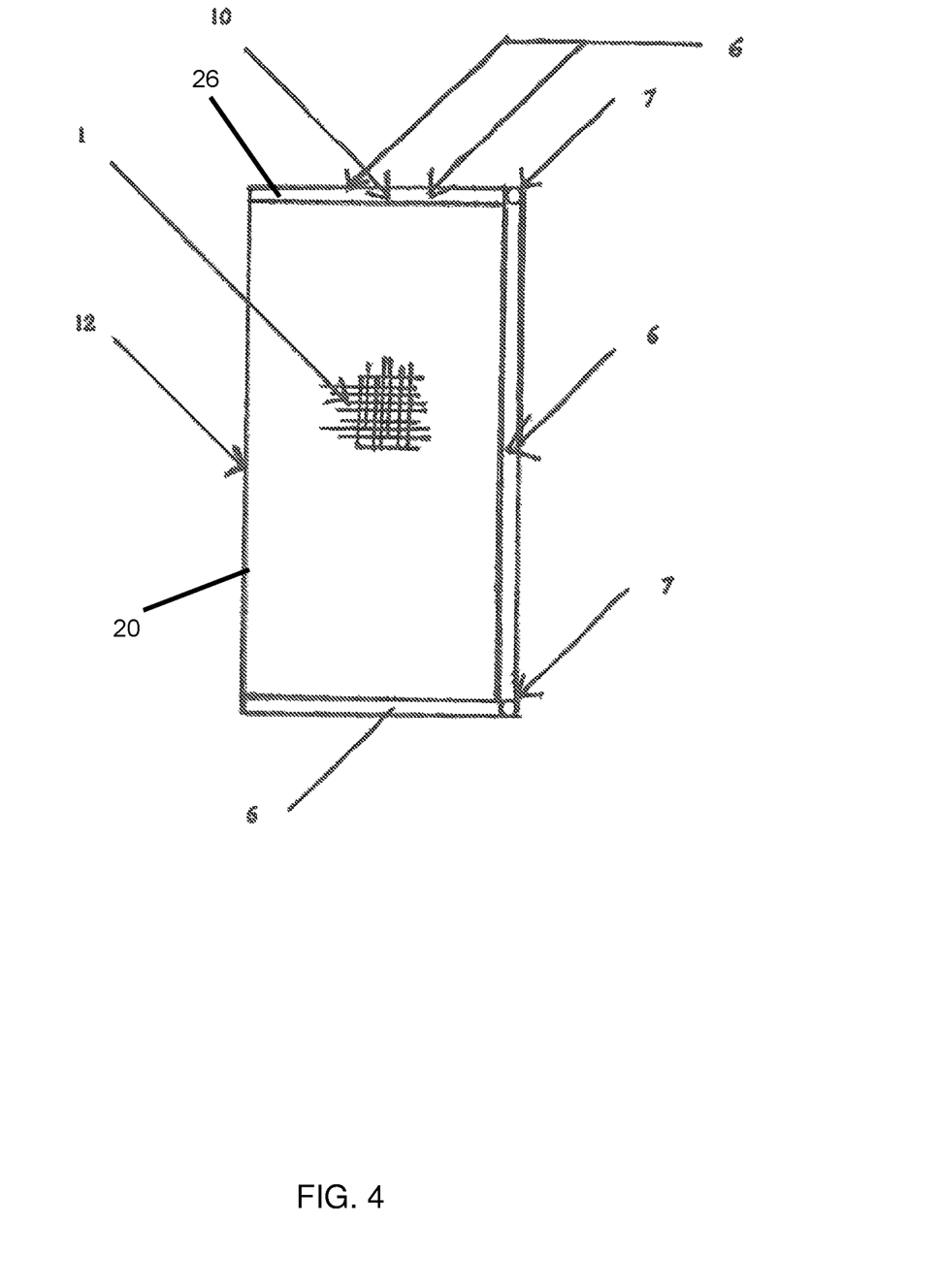
FIG. 4 is a view of a portion of an embodiment of the invention using a hook-and-loop closing system shown in a closed position.
Figure 5:
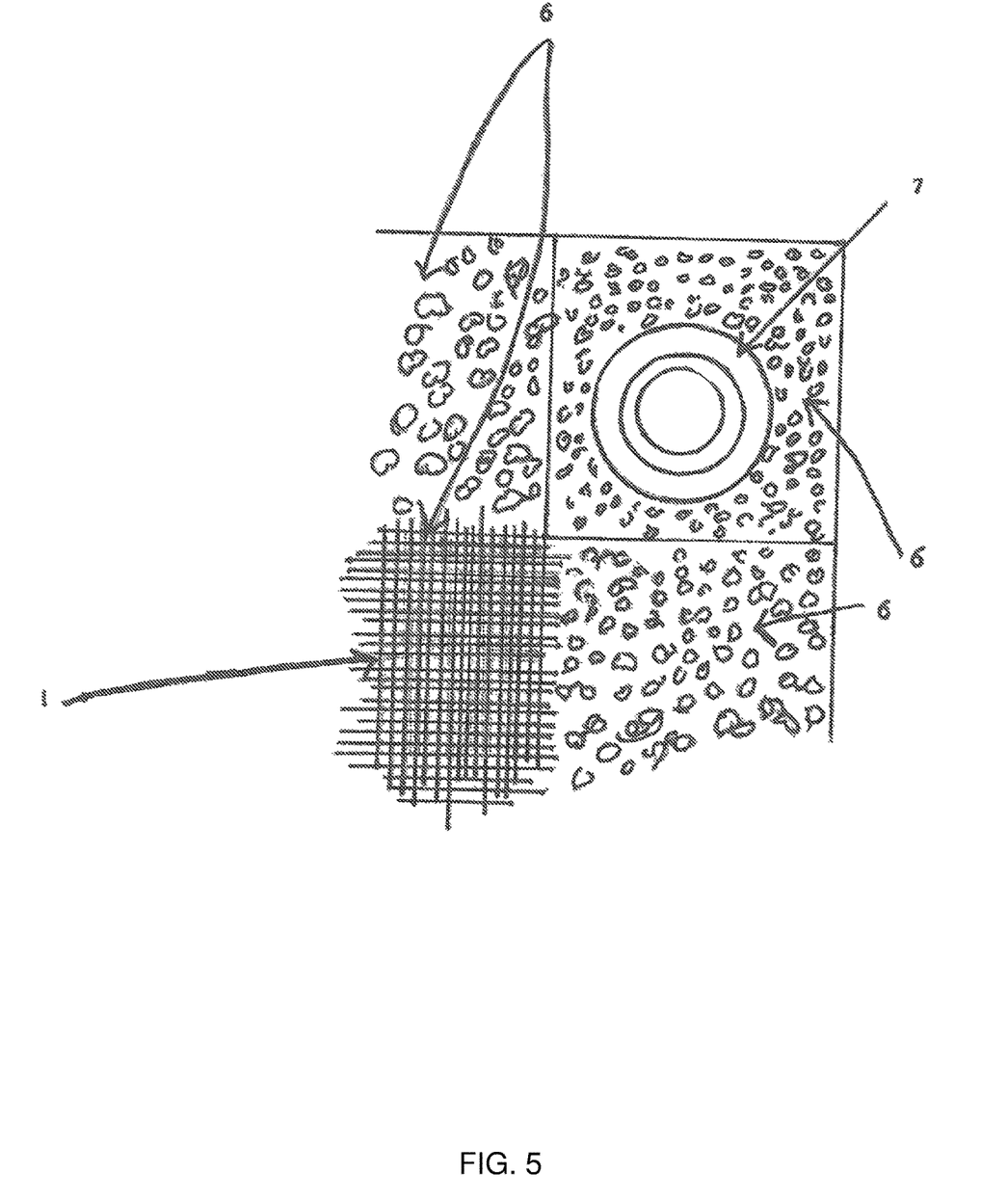
FIG. 5 is a detail view of one grommet in a hook-and-loop embodiment of the invention.

In addition to preventing contamination by foreign material and objects found on the ground, given the known problem of insect attraction to meat (3), embodiments of the invention can effectively prevent insect access to a game animal (2), carcass (4), or even portions of already-butchered meat (3), as examples shown in FIG. 2, FIG. 6, and FIG. 9. A substantially planar foldable envelope could be used to wrap an animal into an enclosed packet (17) and then be raised into a hanging position, or perhaps loaded into a vehicle for transportation.

At the same time that access by insects and other undesired foreign material may be prevented, embodiments of the invention may nonetheless allow for relatively unrestricted airflow to a carcass (4) or meat (3) or the like. This airflow may serve many purposes, including but not limited to keeping portions of the meat (3) cool and assisting in curing already-butchered meat portions (3), as examples. Such a relatively open system may also confer advantages over prior systems when it becomes necessary to clean embodiments of the present technology for reuse. First, embodiments of the invention using a vinyl coated mesh material (1) may be more resistant to staining and less likely to retain contaminants such as blood and the like to begin with. Second, embodiments of the invention using such a material may be easy to clean with something as simple as a cold water rinse, although more advanced cleaning solutions may of course be used depending on the preference of an individual user. Third, the configuration of embodiments of the invention that make it a simple task to bag large game animals may also make cleaning a simpler task, as all surfaces of both the interior and exterior of particular embodiments may be more easily accessed than they are in prior systems.

Figure 10:
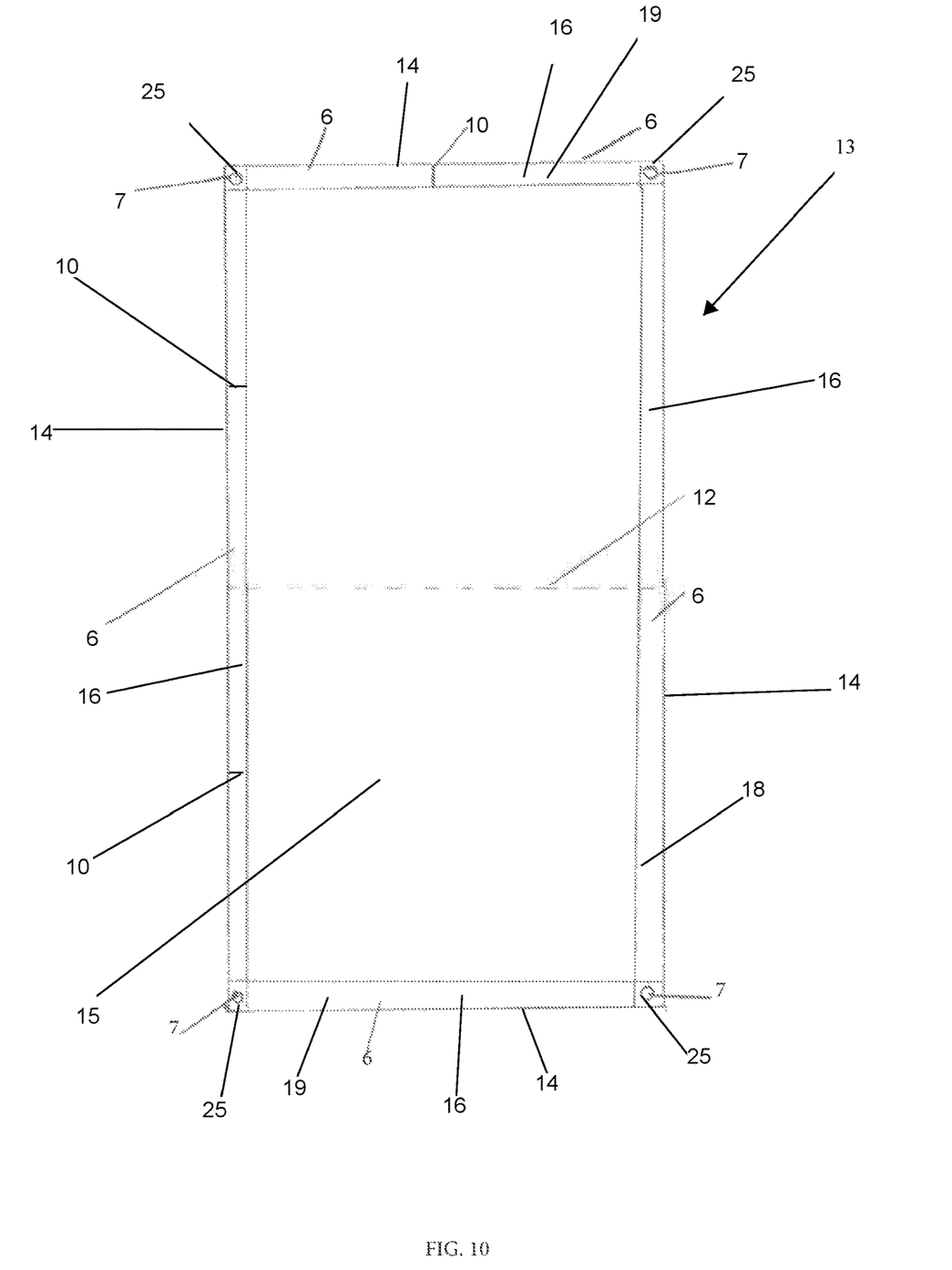
FIG. 10 is a view of an embodiment of the invention, shown in the open position, with a plication component indicated by a dash across the figure's center.

Because of the durable nature and strength of the material used to make some embodiments of the present invention, it may present multiple uses for the outdoorsman in a single product. As but one example, with the installation of at least one grommet (7) perhaps near a corner (25) of an envelope or even four grommets near each of four corners, as shown in FIG. 10, a single envelope may have multiple uses including but not limited to: a pickup bed cover, a tent or shade cover, a suspended chair or hammock, a sleeping ground cloth, and a holder for a foam pad or mattress, again perhaps for sleeping. Embodiments of the present invention may have highly visible colors may also be used as signal flags, which search teams may be able to easily locate from the air. Indeed, embodiments of the invention may allow for full color printing in any color a user may desire.

An additional advantage of embodiments of the present system is that they may have a longer effective life and term of use than prior systems do. The wear-and-tear such systems are subjected to is substantial. As examples, such systems frequently need to be dragged along the ground, tied shut, hoisted into a truck bed or into a hanging position or the like, rinsed or scrubbed clean, and poked with bits of bone or antler or claw or fin or the like when used to haul carcasses (4). These and other stressors may contribute greatly to the relatively short effective life of many prior systems. However, embodiments of the present system that utilize a vinyl coated mesh system (1) may provide for a substantially greater number of uses before needing to be replaced, if in fact they wear out at all.

Embodiments of the present technology may be produced and created for use in a variety of settings. Depending on the individual user, various sizes of the present technology may be created. Larger size bags for bigger game animals such as deer or elk (4) or the like may be created; smaller bags for various fish (2) and fowl animals may be created; and still smaller bags for already-dressed or already-butchered portions of meat (3) may additionally be created with the technology present in embodiments of the present system. Any and all sizes may be created with embodiments of the present technology, and any size so created may still confer any or all of the aforementioned advantages over prior systems.

Figure 11:
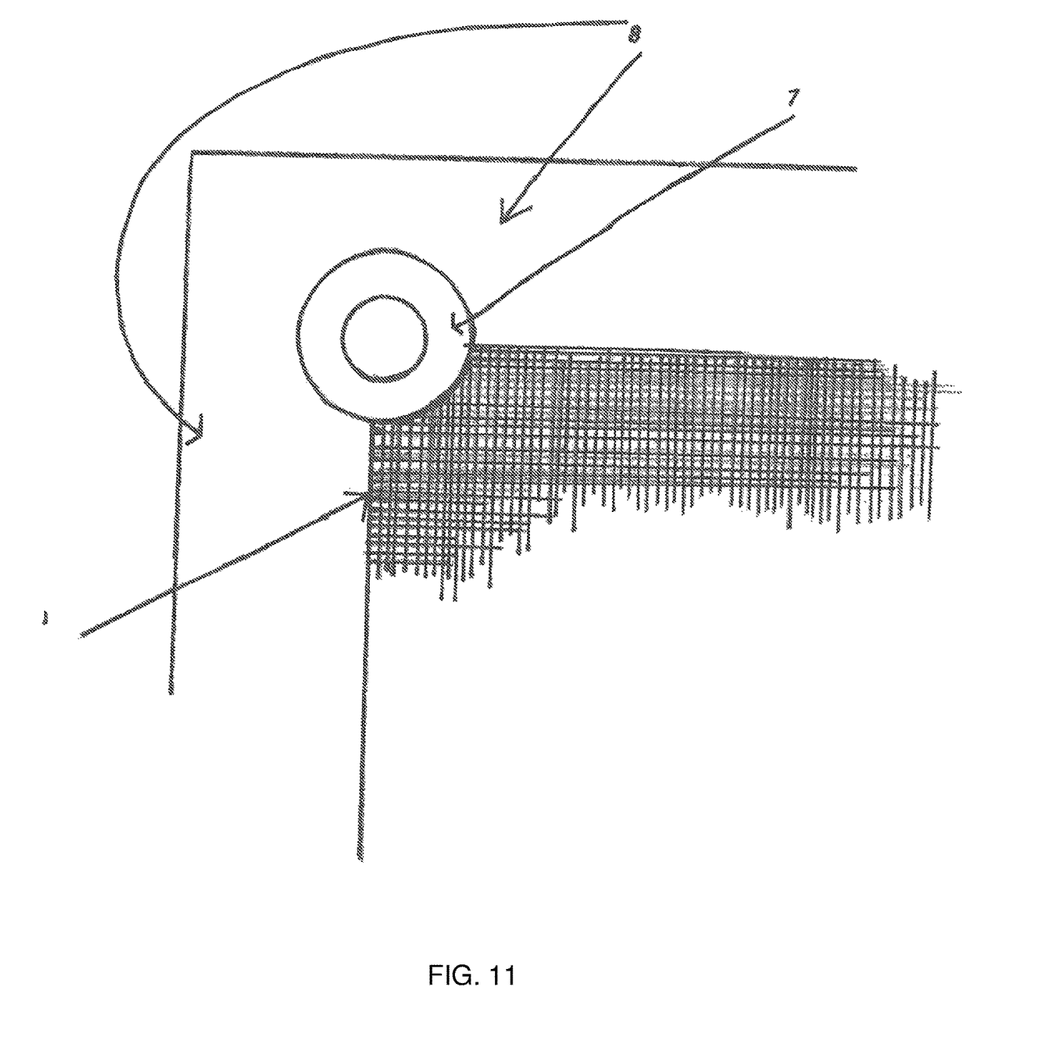
FIG. 11 is a detail view of an embodiment of the invention, utilizing an RF weld closing system.

Multiple options for closing embodiments of the present technology may be utilized. Embodiments of the system may utilize an RF weld closing system (8), as shown in FIG. 11. Embodiments may additionally utilize grommets (7) and rope (9) as a closing system. These embodiments may utilize the novel vinyl material (1) and capture the advantages discussed above in using such material. However, in some embodiments, additional closing mechanisms are described. A hook-and-loop closing mechanism may be created as a sealing securement (6). These closing systems may provide an advantage over others in their ease of use. All securements, however, are considered alternative embodiments of the present invention.

A variety of vinyl coated mesh materials (1) may be utilized to effectively realize the aforementioned advantages of embodiments of the present invention. In some embodiments of the present invention, a vinyl coated mesh material (1) may have with a tensile strength of about 140 lbs.×about 120 lbs. A variety of other tensile strengths may, of course, be present, either stronger or weaker than the aforementioned about 140 lbs.×about 120 lbs. A material may possess a tear resistance of about 80 lbs.×about 80 lbs. In other embodiments, a variety of other tear resistances, either weaker or stronger than the aforementioned about 80 lbs.×about 80 lbs., may be present. In other embodiments, a material may possess an air permeability of about 215 gallons/square yard/second. In yet other embodiments, a variety of other air permeabilities, either lesser or greater than the aforementioned about 215 gallons/square yard/second, may be present. A vinyl coated mesh material (1) may be a polyester weft inserted knit which may have a weight of 9 oz/square yard. Any or all of the above embodiments may confer, to various degrees, the advantages discussed above.

Figure 1:
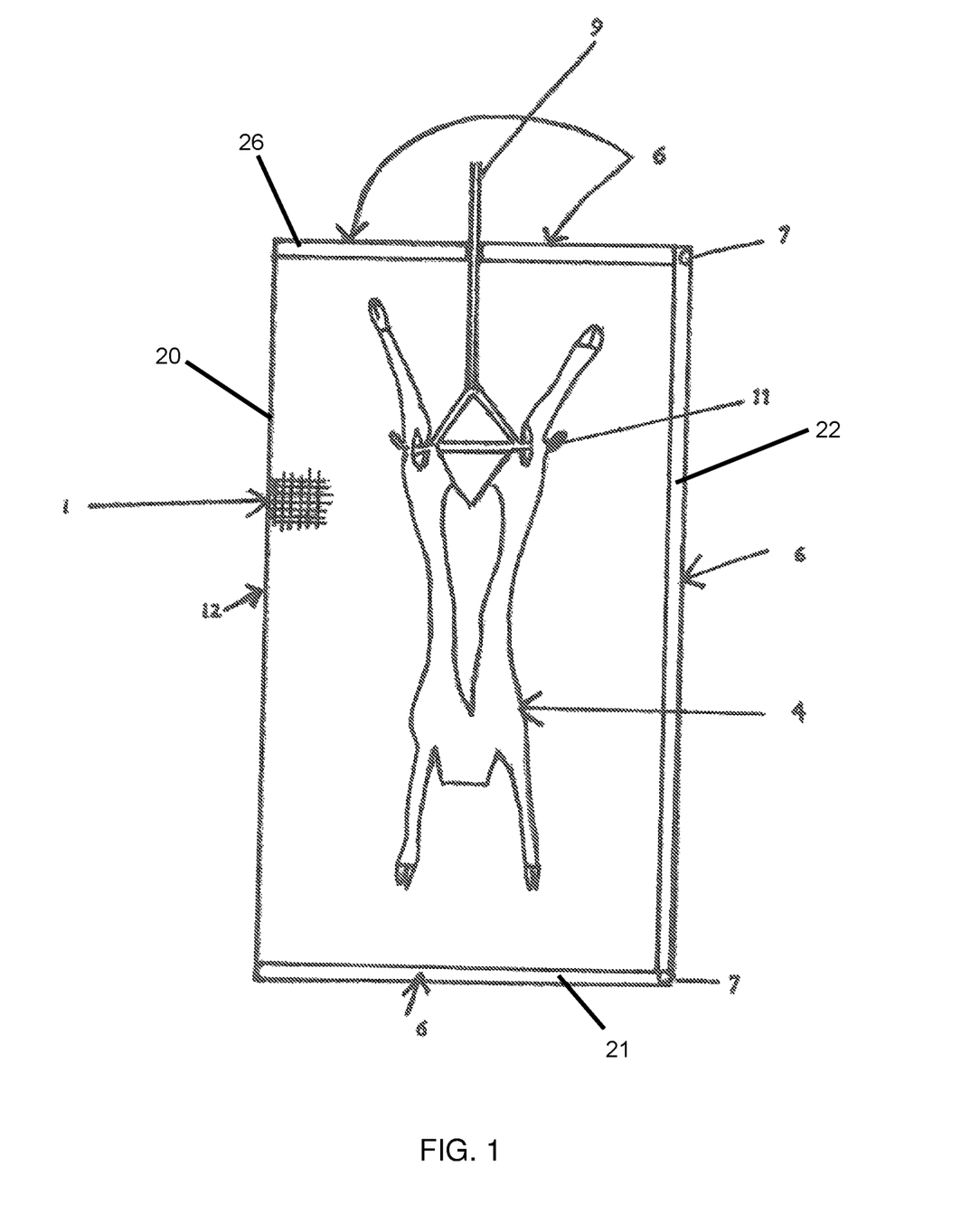
FIG. 1 is a view of an embodiment of the invention in use, with a cable and gambrel in place to anchor a carcass.

Embodiments of the inventive technology may have unique features different from competitive products. In one embodiment, the top of the bag may have a flap perhaps with a slit (10) in the center. In other embodiments, the top of the bag may have a sealing securement (6), perhaps with at least one opening (10) in the center. On opening (10) may be, but is not limited to a slit, hole, tear, and the like. A purpose of the opening may be to allow a rope or cable or chain or the like to be connected to a carcass via a gambrel (11) or other such device, as shown in FIG. 1. A plication component (12), which may be similar to an envelope flap, can offer greater support and/or a better seal than traditional drawstring closure systems, thereby perhaps preventing insect entry into the meat (3). A plication component (12) may be located at any place in an envelope such as but not limited to horizontal, vertical, diagonal, off-center, and the like, and all are meant to be included in this disclosure. Additionally, embodiments which feature a plication component (12) may preserve space relative to a traditional drawstring closure system, as the typical scrunching that occurs when a drawstring is pulled may not occur in such embodiments. An envelope of the present invention may be configured to fold around a carcass hanging on a gambrel and enclosing a substantially planar foldable envelope around both the 15 animal carcass and the gambrel perhaps utilizing an opening (10).

As mentioned, in some embodiments of the present invention, a sealable animal carcass enclosement system may include a substantially planar foldable envelope (13) made of a vinyl coated mesh material (1). When in an open state (15), a substantially planar foldable envelop may have four sides (14) perhaps as in a shape of a rectangle or square. In other embodiments, a foldable envelope may be a different shape such as but not limited to circular, oval, a combination of curved and straight sides, and the like. A sealing securement may be located along or near an edge (16) of at least three of said four sides of a substantially planar foldable envelope when in said open state (15). In other embodiments, a sealing securement may be located along or near an edge of at least two of said four side of a substantially planar foldable envelope. This may depend on how the envelope may be used, perhaps by a folding across or by folding up. In other embodiments, a sealing securement may be located at any part of an envelope. A plication component (12) which may be an element to help with an act of folding an envelope, may be configured to guide overlapping closure of a substantially planar foldable envelope and perhaps even matching of counterparts of sealing securements so as to provide an enclosed packet (17) for animal carcasses. An example of matching counterparts of sealing securements may be one side edge of sealing securements secured with an opposite side of sealing securements when folded over. Another example may include folding over of an edge so that perhaps half of the edge is secured with another half of the same edge when folded over.

An enclosed packet may have a fastened bottom edge (18) and even a fastened side edge (19) opposite of a folded side (20). Of course, a bottom edge and side edges may be different depending on how a system is folded. For example, if an envelope is folded across, it may have a bottom edge that may be fastened with an overlapping bottom edge (21) of a bottom side and a side edge that is fastened as an overlapping side edge (22) opposite of a folded side (20). An overlapping side edge of a first side edge may be secured with a second side edge of a substantially planar foldable envelope.

Figure 7:
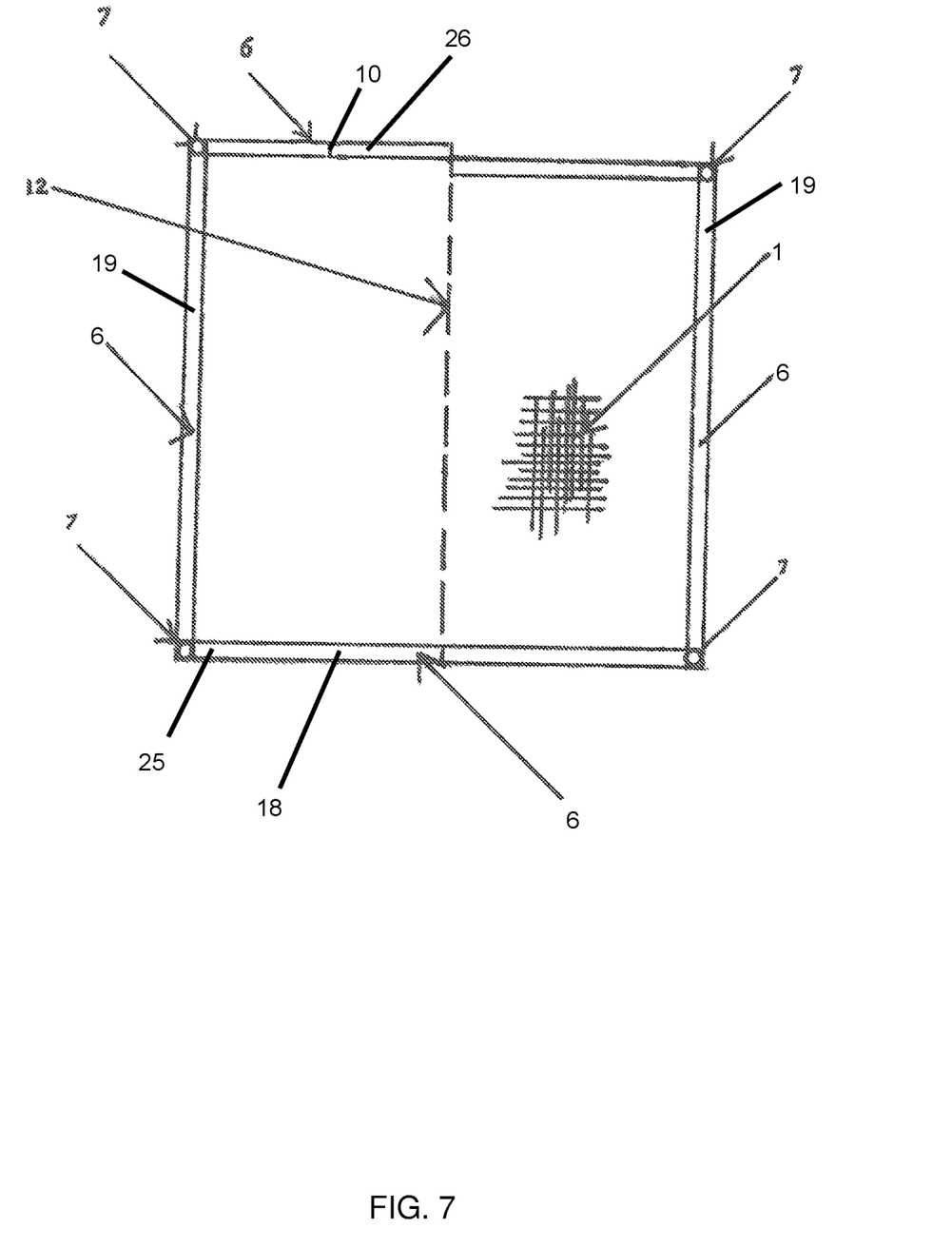
FIG. 7 is a view of an embodiment of the invention, in the open position with no additional items apart from a bag embodiment shown.
Figure 8:
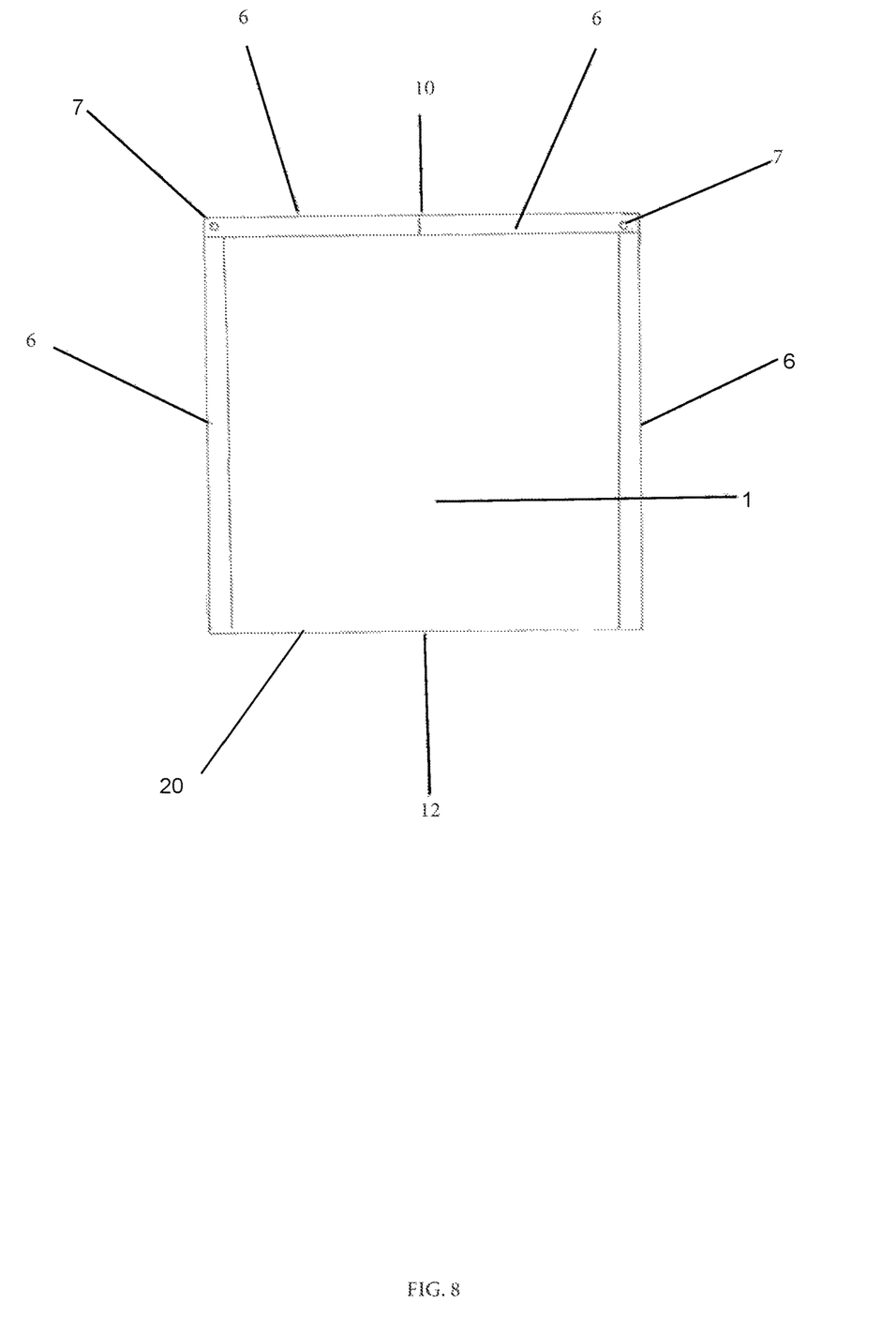
FIG. 8 is a view of an embodiment of the invention, shown in the closed position.

For an envelope that may be folded up, side edges may be overlapped to provide two overlapping side edges such as that found as a bottom edge overlap in an across folding system. A top edge may be opposite of a folded side. A top edge (26) may be secured with a sealing securement or may not have a sealing securement. A sealing securement may be an openable sealing securement perhaps where it can be closed and then opened which may allow the ability to use and reuse the sealing securement. In some embodiments, a top edge (26) may be a foldable extended top edge such as shown in FIG. 7.

An example of a method of use of certain embodiments of the present invention may include providing an animal carcass; placing a substantially planar foldable envelope near an animal carcass; wrapping a substantially planar foldable envelope around an animal carcass; fastening a bottom edge and a side edge of a substantially planar foldable envelope around an animal carcass with a sealing securement along an edge of the bottom edge and a side edge of a substantially planar foldable envelope; providing air flow to an animal carcass when enclosed by a substantially planar foldable envelope; and perhaps even protecting said animal carcass. When folded, embodiments of the present invention may provide overlapping a bottom edge of said substantially planar foldable envelope and even fastening an overlapped bottom edge of a bottom edge with a sealing securement of a substantially planar foldable envelope; and even overlapping a first side edge with a second side edge of a substantially planar foldable envelope and fastening the first side edge with the second side edge with a sealing securement. A top may be secured when in an enclosed state, in some embodiments.

As mentioned above, there may be multiple uses for a substantially planar foldable envelope including but not limited to using it for a covering such as a tent, blanket, hammock, or the like. Two or more envelopes may be used together with its sealing securements perhaps to make one large envelope which may be used to create a large enclosed packet. An envelope in accordance with the various embodiments discussed herein may be durable so that it can be reused.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves apparatus, systems, methods, and techniques as well as devices to accomplish game animal storage, transport and the like. In this application, the improved techniques, including novel and unique methods and apparatus for game animal storage and transport, are disclosed as part of the results shown to be achieved by the various devices described and as steps which are inherent to utilization. They are simply the natural result of utilizing the devices as intended and described.

In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment, an apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "fold" should be understood to encompass disclosure of the act of "folding"—whether explicitly discussed or not—and, conversely, were there effectively disclosure of the act of "folding", such a disclosure should be understood to encompass disclosure of a "folding method and/or technique, and or device" and even a "means for folding". Such changes and alternative terms are to be understood to be explicitly included in the description.

In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of Information Disclosure Statement or other information statement filed with the application are hereby appended and hereby incorporated by reference herein in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods, improvements and/or devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall within the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A sealable animal carcass enclosement system comprising:
   a substantially planar foldable sheet comprising a vinyl coated mesh material, wherein said substantially planar foldable sheet has four sides when in an open state;
   wherein said four sides of said substantially planar foldable sheet when in said open state comprises a single top side having a top edge, a bottom side having a bottom edge, a first side having a first side edge, and a second side having a second side edge;
   wherein part of said top edge of said single top side comprises a foldable extended top edge along a first half of said single top side of said substantially planar foldable sheet when in said open state;
   wherein a second half of said single top side is not extended when in said open state;
   at least one slit in said foldable extended top edge;
   a sealing securement along said first side edge, a first half of said bottom edge, and said foldable extended top edge of said substantially planar foldable sheet when in said open state;
   a counterpart sealing securement along said second side edge, a second half of said bottom edge, and said second half of said single top side that is not extended of said substantially planar foldable sheet when in said open state;
   a plication component down a middle of said substantially planar foldable sheet in said open state;
   wherein said substantially planar foldable sheet is configured to be foldable between said open state and a folded closed state forming an enclosed packet;
   wherein said plication component down said middle of said substantially planar foldable sheet in said open state is configured to guide overlapping closure of said substantially planar foldable sheet and matching said sealing securements to said counterpart sealing securements so as to provide said enclosed packet for animal carcasses;
   wherein said enclosed packet comprises a folded side edge at said plication component formed by folding said substantially planar foldable sheet along said plication component;
   wherein said enclosed packet comprises said sealing securement along said first side edge fastened to said counterpart sealing securement along said second side edge to form a fastened side edge opposite said folded side edge;
   wherein said enclosed packet comprises said sealing securement along said first half of said bottom edge fastened to said counterpart sealing securement along said second half of said bottom edge to form a fastened bottom edge opposite said top edge;
   wherein said enclosed packet comprises said sealing securement along said foldable extended top edge folded over and fastened to said counterpart sealing securement along said second half of said single top side; and
   wherein said at least one slit is configured to allow at least part of a gambrel device to pass through said slit when fastened in said enclosed packet.

2. The sealable animal carcass enclosement system of claim 1 wherein said sealing securement comprises hook and loop closures.

3. The sealable animal carcass enclosement system of claim 1 and further comprising at least one grommet in said substantially planar foldable sheet.

4. The sealable animal carcass enclosement system of claim 3 wherein said at least one grommet comprises four grommets in said substantially planar foldable sheet, one near each corner of said substantially planar foldable sheet when in said open state.

5. The sealable animal carcass enclosement system of claim 1 wherein said substantially planar foldable sheet in said open state comprises a shape selected from a group consisting of a square and rectangle.

6. The sealable animal carcass enclosement system of claim 1 wherein said vinyl coated mesh material comprises a tensile strength of about 140 pounds by about 120 pounds.

7. The sealable animal carcass enclosement system of claim 1 wherein said vinyl coated mesh material comprises a tear resistance of about 80 pounds by 80 pounds.

8. The sealable animal carcass enclosement system of claim 1 wherein said vinyl coated mesh material comprises an air permeability of about 216 gallons per square yard per second.

9. The sealable animal carcass enclosement system of claim 1 wherein said sealing securement comprises an openable sealing securement.

10. A method of storing an animal carcass comprising the steps of:
    providing an animal carcass attached to a gambrel device;
    placing a substantially planar foldable sheet made of a vinyl coated mesh material near said animal carcass;
    providing four sides on said substantially planar foldable sheet when in an open state, wherein said four sides comprises a single top side having a top edge, a bottom side having a bottom edge, a first side having a first side edge, and a second side having a second side edge;

providing a foldable extended top edge a first half of said top edge of said single top side of said substantially planar foldable sheet when in said open state;

providing a second half of said single top side of said substantially planar foldable sheet in said open state, wherein said second half of said single top side is not extended;

providing a sealing securement along said first side edge, a first half of said bottom edge, and said foldable extended top edge of said substantially planar foldable sheet when in said open state;

providing a counterpart sealing securement along said second side edge, a second half of said bottom edge, and said second half of said single top side that is not extended of said substantially planar foldable sheet when in said open state;

wrapping said substantially planar foldable sheet around both said animal carcass and said gambrel device to create a closed packet;

allowing at least part of said gambrel device to pass through at least one slit in said foldable extended top edge;

folding said foldable extended top edge of said substantially planar foldable sheet over said second half of said single top side of said substantially planar foldable sheet and around said gambrel device when in said closed packet;

fastening said sealable securement along said foldable extended top edge to said counterpart sealing securement along said second half of said single top side of said substantially planar foldable sheet;

fastening said sealing securement along said first side edge to said counterpart sealing securement along said second side edge;

fastening said sealing securement along said first half of said bottom edge to said counterpart sealing securement along said second half of said bottom edge;

providing air flow to said animal carcass when enclosed by said substantially planar foldable sheet in said closed packet; and protecting said animal carcass.

11. The method of storing an animal carcass of claim 10 and further comprising the step of using said substantially planar foldable sheet as a covering.

12. The method of storing an animal carcass of claim 10 and further comprising the step of re-using said substantially planar foldable sheet.

13. The method of storing an animal carcass of claim 10 wherein said substantially planar foldable sheet in said open state comprises a shape selected from a group consisting of a square and rectangle.

14. The method of storing an animal carcass of claim 10 wherein said sealing securement comprises hook and loop closures.

15. The method of storing an animal carcass of claim 10 wherein said step of providing air flow to said animal carcass when enclosed by said substantially planar foldable sheet comprises the step of providing an air permeability of about 216 gallons per square yard per second.

16. The method of storing an animal carcass of claim 10 wherein said vinyl coated mesh material comprises a tensile strength of about 140 pounds by about 120 pounds.

17. The method of storing an animal carcass of claim 10 wherein said vinyl coated mesh material comprises a tear resistance of about 80 pounds by 80 pounds.

\* \* \* \* \*